(12) United States Patent
Ishita et al.

(10) Patent No.: US 7,062,412 B2
(45) Date of Patent: Jun. 13, 2006

(54) INTERACTIVE DEMONSTRATION METHOD FOR A MEASURING INSTRUMENT AND SYSTEM USING A NETWORK

(75) Inventors: Yoshihiro Ishita, Tokyo (JP); Keith Cobler, Plano, TX (US); Shuichi Nakayabu, Atsugi (JP)

(73) Assignee: Anritsu Corporation, Tokyo (JP)

( * ) Notice: Subject to any disclaimer, the term of this patent is extended or adjusted under 35 U.S.C. 154(b) by 186 days.

(21) Appl. No.: 10/070,512

(22) PCT Filed: Jul. 6, 2001

(86) PCT No.: PCT/JP01/05889

§ 371 (c)(1),
(2), (4) Date: Jun. 27, 2002

(87) PCT Pub. No.: WO02/11003

PCT Pub. Date: Feb. 7, 2002

(65) Prior Publication Data

US 2002/0199135 A1   Dec. 26, 2002

(30) Foreign Application Priority Data

Jul. 7, 2000 (JP) ............................. 2000-207115

(51) Int. Cl.
*G06F 15/00* (2006.01)

(52) U.S. Cl. ........................................ 702/188; 340/3.1
(58) Field of Classification Search ................ 702/122, 702/127, 182–188; 345/740, 744–747; 340/3.1, 340/3.32, 286.01; 709/217–219
See application file for complete search history.

(56) References Cited

U.S. PATENT DOCUMENTS

| | | | | |
|---|---|---|---|---|
| 5,790,977 A | * | 8/1998 | Ezekiel | 702/122 |
| 5,861,882 A | * | 1/1999 | Sprenger et al. | 345/700 |
| 5,968,110 A | * | 10/1999 | Westrope et al. | 705/27 |
| 6,049,823 A | * | 4/2000 | Hwang | 725/82 |
| 6,239,796 B1 | * | 5/2001 | Alexander | 345/809 |
| 6,434,533 B1 | * | 8/2002 | Fitzgerald | 705/10 |
| 6,499,054 B1 | * | 12/2002 | Hesselink et al. | 709/204 |
| 6,510,350 B1 | * | 1/2003 | Steen et al. | 700/9 |
| 6,546,555 B1 | * | 4/2003 | Hjelsvold et al. | 725/1 |
| 6,560,557 B1 | * | 5/2003 | Carnahan et al. | 702/122 |

FOREIGN PATENT DOCUMENTS

EP   0 150 410 A1   8/1985

* cited by examiner

*Primary Examiner*—Marc S. Hoff
*Assistant Examiner*—Mary Catherine Baran
(74) *Attorney, Agent, or Firm*—Frishauf, Holtz, Goodman & Chick, P.C.

(57) ABSTRACT

A measuring instrument information providing server delivers to a user terminal via a network an operational program that contains demonstration information for enabling dynamic and interactive operation of a measuring instrument in response to a request for providing demonstration information on the predetermined measuring instrument from a user terminal and a request for making operation, and causes the user terminal to deliver to a predetermined measuring instrument terminal via the network an operational command that contains demonstration information operated and inputted at the user terminal. The measuring instrument information providing server causes the measuring instrument terminal to control the predetermined measuring instrument connected to the measuring instrument terminal in response to the operational command from the user terminal in order to operate the measuring instrument and to deliver a measurement result obtained by the measuring instrument to the user terminal via the network.

9 Claims, 9 Drawing Sheets

```
                    28
                    )
┌─────────────────────────────────────────────┐
│  Home page of ○×○× communication equipment Co., Ltd. │
│  ─────────────────────────────────────────  │
│   Product introduction  1.Filter circuit ──29 │
│                         2.Oscillator ──29   │
│                         3.Amplifier ──29    │
│                          ⋮                  │
│                                             │
│     ☐ Click the following URL of measuring  │
│       instrument information providing server│
│       for testing each product              │
│                                             │
│   ○○×○ measuring service http://www.○○×○.co.jp │
│                                     ─────── │
└─────────────────────────────────────────────┘
                                        )
                                        30
```

FIG. 10

INTERACTIVE DEMONSTRATION METHOD FOR A MEASURING INSTRUMENT AND SYSTEM USING A NETWORK

This application is a U.S. National Phase Application under 35 USC 371 of International Application PCT/JP01/05889 (not published in English) filed Jul. 6, 2001.

TECHNICAL FIELD

The present invention relates to an interactive demonstration method for a measuring instrument and system using a network. More particularly, the present invention relates to an interactive demonstration method for a measuring instrument and system using a network in which demonstration of a measuring instrument developed by a measuring instrument manufacturer is dynamically and interactively executed between the manufacturer and a user (person who wants to purchase the measuring instrument) via a network such as an internet.

BACKGROUND ART

For a company that develops a variety of products and manufactures and sells such developed products, it is an important task to let customers know such products are for sale.

In general, advertisement of these products is carried out by utilizing mass media such as various kinds of newspapers, journals, or TV.

Hence, for example, advertisement of a measuring instrument for measuring properties of electronic communication equipment or electronic parts is typically carried out by inserting advertisements in their associated journals.

In this case, in a complicated measuring instrument in which measurement items are diversified, if only measurement items or specifications are described in the advertisement fields of their associated journals, an amount of information is insufficient for a general user who attempts to purchase or install such a measuring instrument.

To such a user having interest in such a measuring instrument (person who wants to purchase the measuring instrument), a manufacturer of this measuring instrument creates a demonstration video tape having recorded therein demonstration of handling or operation of the measuring instrument, and delivers or gives it to the person who wants.

The user of this measuring instrument (person who wants to purchase the instrument) mounts the demonstration videotape on one's own video player, and checks the demonstration of handling or operation on a TV screen.

In addition, a manufacturer of this measuring instrument writes data for demonstration of handling or operation of this measuring instrument into a demonstration CD-ROM, and delivers or gives such a CD-ROM to a person who wants to purchase the measuring instrument.

The person who wants to purchase the measuring instrument mounts such a demonstration CD-ROM on one's own PC terminal, and checks the data for demonstration of handling or operation on the PC terminal display screen.

Further, in recent years, there has been implemented a system for distributing to a person who wants, via a communication network, demonstration data for demonstration of handling or operation of a measuring instrument stored in the CD-ROM.

In this case, the user (person who wants to purchase the instrument) having received distribution of the demonstration data via a communication network, checks information on the handling or operation of the measuring instrument, which was received by one's own PC terminal, on the display screen.

However, the following problems to be solved have remained unsolved in each of the above described techniques.

That is, for example, in a measuring instrument for a variety of modulation signals or in a measuring instrument that carries out waveform analysis or frequency analysis, it is required that a tremendous number of measurement items or measurement conditions are set.

It is very difficult to generate demonstration data for demonstration of handling or operation which fully covers such a tremendous number of measurement items or measurement conditions, and it is not realistic to generate such demonstration data.

Even if such demonstration data has successfully been generated, an amount of the data becomes tremendously large, thus requiring a considerable amount of time for a user to search for a portion of one's own interest.

Further, where the demonstration data is distributed to a person who wants to purchase it via a communication network, the communication time and communication cost significantly increase.

Furthermore, the demonstration data for handling or operation of the measuring instrument, the data being delivered or distributed via a communication network to the above described person, only concerns demonstration under typical measurement items or measuring conditions which are statistically provided.

Thus, a user (person who wants to purchase the instrument) cannot check demonstration data for dynamic and interactive demonstration, the data including measurement items, measuring conditions or the like of one's own interest.

Therefore, the user (person who wants to purchase the instrument) has only one way to operate an actual measuring instrument by themselves at a shop or showroom of the measuring instrument manufacturer or ask a person in charge to operation the instrument.

On the other hand, in the U.S. Pat. No. 5,790,977, "Data Acquisition from Remote Instrument via Internet", there is disclosed a technique concerning a system for providing access to measurement of a vector modulation analysis (VMA) instrument or the like from an arbitrary place in the world so as to achieve remote control, data acquisition of measurement results, screen capture, and status, remote diagnostics and many other uses.

Hence, in a system disclosed in this U.S. Pat. No. 5,790,977, data acquisition can be only achieved of typical measurements items or measuring conditions which are statistically provided, and dynamic and interactive data acquisition including measurement items or measuring conditions of the user's interest cannot be achieved.

In addition, in the U.S. Pat. No. 5,790,977, there is neither disclosure nor suggestion of a technique for constructing an interactive demonstration system for a measuring instrument using a network in order for a user (person who wants to purchase the instrument) to know the details on various measuring instruments which are newly developed and to acquire dynamic and interactive demonstration information including measurement items, measuring conditions of the user's interest or the like.

DISCLOSURE OF THE INVENTION

The present invention is carried out in view of the forgoings, and it is an object of the present invention to provide an interactive demonstration method for a measuring instrument and system using a network in order for a user to know, via a communication network, detailed demonstration information concerning demonstration of a variety of measuring instruments developed by a measuring instrument manufacturer and to acquire dynamic and interactive demonstration data including measurement items or measuring conditions of the user's interest concerning a predetermined measuring instrument. In more detail, the present invention includes a demonstration data provider for demonstration of a measuring instrument which delivers, in response to access from a user, an operational program that contains demonstration information for enabling the user to operate a predetermined measuring instrument dynamically and interactively, via a network to a user terminal.

In order to achieve dynamic and interactive data acquisition including measurement items, measuring conditions or the like of interest the measuring instrument, each user operates and inputs measurement items or measuring conditions of interest by using one's own terminal conforming with a general specification, the terminal being connectable with a network based on the operational program. This makes it possible to achieve dynamic and interactive data acquisition including measurement items or measuring conditions of one's own interest in the measuring instrument.

In addition, the demonstration information provider for demonstration of a measuring instrument as well can automatically provide demonstration information for demonstration of the measuring instrument to each user dynamically and interactively, thereby making it possible to improve service provided to users.

In order to achieve the foregoing object, according to the present invention, there is provided 1. an interactive demonstration method for a measuring instrument using a network, comprising:

in response to a request for providing demonstration information on a predetermined measuring instrument (6) from a user terminal (3) and a request for making operation, delivering to the user terminal (3) via a network (1) an operational program that contains demonstration information for enabling dynamic and interactive operation of the measuring instrument;

causing the user terminal (3) to deliver to a predetermined measuring instrument terminal (5) via the network (1) an operational command that contains demonstration information operated and inputted at the user terminal in order to operate the measuring instrument (6) dynamically and interactively based on the delivered operational program;

causing the measuring instrument terminal (5) to control the predetermined measuring instrument (6) connected to the measuring instrument terminal (5) in response to the operational command that contains demonstration information from the user terminal (3) in order to dynamically and interactively operate the measuring instrument (6) and to deliver a measurement result obtained by the measuring instrument (6) to the user terminal (3) via the network (1); and causing the user terminal (3) to output the measurement result delivered from the measuring instrument terminal (5) via the network (1).

In order to achieve the foregoing object, according to the present invention, there is provided 2. an interactive demonstration system for a measuring instrument using a network, comprising:

a measuring instrument terminal (5);

a measuring instrument information providing server (2); and a user terminal (3), each of which is connected to a network (1), wherein the measuring instrument information providing server (2) has:

storage means (13) for storing an operational program that contains demonstration information for enabling dynamic and interactive operation of an operational screen (14) representative of an operating portion (24) for operating the predetermined measuring instrument (6) connected to the measuring instrument terminal (5) and the predetermined measuring instrument (6); and program delivery means (18, 10) for reading out from the storage means (13) the operational program that contains demonstration information for enabling dynamic and interactive operation of the measuring instrument (6) in response to a request for providing demonstration information on the predetermined measuring instrument (6) from the user terminal (3) and a request for making operation, and then, delivering the program to the user terminal (3) via the network (1);

the user terminal (3) has:

a terminal screen (14) and a terminal operating portion (24);

operation execution request delivery means for delivering a request for providing demonstration information on the predetermined measuring instrument and a request for making operation to the measuring instrument information providing server (2) via the network (1);

program execution means for executing the operational program that contains demonstration information for enabling dynamic and interactive operation of the predetermined measuring instrument (6), the information being delivered from the measuring instrument information providing server (2), thereby making it possible to visualize an operation face of the measuring instrument (6) on the terminal screen (14) and to operate the operation face at the terminal operating portion (24);

means for delivering an operational command operated and inputted at the terminal operating portion (24) to the measuring instrument terminal (5) via the network (1), thereby causing desired measurement by the predetermined measuring instrument (6) connected to the measuring instrument terminal (5); and means for outputting a measurement result received from the measuring instrument terminal (5) via the network (1), and the measuring instrument terminal (5) has means for controlling the predetermined measuring instrument (6) connected to the measuring instrument terminal (5) in response to the operational command from the user terminal (3) and delivering the measurement result obtained by the measuring instrument (6) to the user terminal (3) via the network (1).

In the thus configured interactive measuring instrument demonstration system using a network, a user operates owned user terminal connectable to a network, provides access to a measuring instrument information providing server, and inputs a request for making operation relevant to a predetermined measuring instrument.

Then, from this measuring instrument information providing server, an operational program for operating a predetermined measuring instrument is transmitted (downloaded) to the user's user terminal.

Next, the user terminal is connected to the measuring instrument terminal, whereby the user can make remote operation freely via the network and the measuring instrument terminal based on the operational program that contains demonstration information for enabling dynamic and interactive operation that has been transmitted (downloaded) in advance in one's own user terminal concerning the measuring instrument connected to the measuring instrument terminal.

A measurement result obtained by this measuring instrument is transmitted to the user's user terminal to be outputted.

In order to achieve the foregoing object, according to the present invention, there is provided 3. an interactive demonstration system for a measuring instrument using a network, comprising:

a measuring instrument providing server (2);

a user terminal 3; and a measuring instrument terminal (5), each of which is connected to a network (1), wherein the measuring instrument information providing server (2) has:

storage means (13) for storing an operational program that contains demonstration information for enabling dynamic and interactive operation of an operational screen (14) representative of an operating portion (24) for operating a predetermined measuring instrument (6) connected to the measuring instrument terminal (5) and a data display area (23) and the predetermined measuring instrument (6); and program delivery means (18, 10) for reading out from the storage means (13) the operational program for the predetermined measuring instrument (6) in response to a request for providing demonstration information on the predetermined measuring instrument from the user terminal (3), and delivering the program to the user terminal (3) via the network (1);

the user terminal (3) has:

a terminal screen (14) and a terminal operating portion (24);

operation execution request delivery means for delivering via the network (1) a request for providing demonstration information on the predetermined measuring instrument (6) to the measuring instrument information providing server (2) and a request for making operation;

program execution means for executing the operational program that contains demonstration information for enabling dynamic and interactive operation of the measuring instrument (6) delivered from the measuring instrument information providing server (2), thereby making it possible to visualize the measuring instrument (6) on the terminal screen (14) and to operate the instrument at the terminal operating portion (24);

means for delivering the operational command operated and inputted at the terminal operating portion (24) to the measuring instrument terminal (5) via the network (1), thereby causing desired measurement by the predetermined measuring instrument (6) connected to the measuring instrument terminal (5); and means for outputting a measurement result received from the measuring instrument terminal (5) to a data display area (23) of the measuring instrument information providing server (2) via the network (1), and the measuring instrument terminal (5) has means for controlling the predetermined measuring instrument (6) connected to the measuring instrument terminal (5) in response to the operational command from the user terminal (3) and for delivering the measurement result obtained by the predetermined measuring instrument (6) to the user terminal (3) via the network (1).

Thus, in the configured measuring instrument interactive demonstration system using a network, an operational screen representative of an operating portion such as an operating icon and a data display area such as a display frame, for example, for an operating measuring instrument other than an operational program, is downloaded to the user terminal, whereby the operational screen having the operating portion (operating ions) and the data display area (display frame) is displayed on the user terminal.

Therefore, a user can remotely operate a measuring instrument by making operation such as mouse clicking the operating icon in the operational screen displayed on one's own user terminal. Further, the measurement result is displayed on the display frame of one's own user terminal.

In this way, the user can remotely operate a measuring instrument with the operating panel interface of an actual measuring instrument at one's own user terminal.

In order to achieve the foregoing object, according to the present invention, there is provided 4. an interactive demonstration system for a measuring instrument using a network according to the above 3, wherein the measuring instrument information providing server has plural types of information on measuring instruments stored, and when an operation execution request inputted from the user terminal while any measuring instrument monitoring information on the measuring instrument can be selected specifies a specific measuring instrument by providing access from the user terminal, the measuring instrument information providing server delivers to the user terminal an operational screen (14) and an operational program (15) that correspond to the measuring instrument, and instructs the user terminal to be connected to the measuring instrument terminal to which the measuring instrument has been connected.

Thus, in the configured measuring instrument interactive demonstration system using a network, when a user provides access to a measuring instrument information providing server, thereby specifying a measuring instrument, one's owner user terminal is automatically switched to be connected to a measuring instrument terminal that is a link destination, thus remarkably improving operability.

In order to achieve the foregoing object, according to the present invention, there is provided 5. an interactive demonstration system for a measuring instrument using a network according to the above 2, wherein a plurality of measuring objects (8) are connected to the measuring instrument connected to the measuring instrument terminal in such a way that any of these objects can be selected, and one or a plurality of measuring objects are selected based on the selection command from the user terminal.

In order to achieve the foregoing object, according to the present invention, there is provided 6. an interactive demonstration system for a measuring instrument using a network according to the above 3, wherein a plurality of measuring objects (8) are connected to the measuring instrument connected to the measuring instrument terminal in such a way that any of these objects can be selected, and one or a plurality of measuring objects are selected based on the selection command from the user terminal.

In order to achieve the foregoing object, according to the present invention, there is provided 7. an interactive demonstration system for a measuring instrument using a network according to above 5, wherein a plurality of measuring objects (8) are connected to the measuring instrument connected to the measuring instrument terminal in such a way that any of these objects can be selected, and one or a plurality of measuring objects are selected based on the selection command from the user terminal.

Thus, in the configured measuring instrument interactively demonstrating system using a network, a user can specify a measuring object in a measuring instrument via one's own user terminal. Thus, the user can check the details on a measurement result, for example.

In order to achieve the foregoing object, according to the present invention, there is provided 8. an interactive demonstration system for a measuring instrument using a network, comprising:

a measuring instrument information providing server (2);

a user terminal (3);

a measuring instrument terminal (5); and a device or parts manufacturer server (27), each of which is connected to a network (1), wherein the device or parts manufacturer server specifies a measuring instrument connected to the measuring instrument terminal for the measuring instrument information providing server according to a test request for a device for sale by oneself inputted from the user terminal, thereby instructing the user terminal to be connected to the measuring instrument information providing server;

the measuring instrument information providing server delivers to the user terminal via the network an operational program that contains demonstration information for enabling dynamic and interactive operation of the measuring instrument in response to a request for providing demonstration information on the measuring instrument specified by the user terminal input and a request for making operation and instructs the user terminal to be connected to the measuring instrument terminal to which the measuring instrument is connected;

the user terminal delivers a request for making operation to the measuring instrument information providing server, delivers to the measuring instrument terminal an operational command having specified an operated and inputted device based on the operational program that contains demonstration information for enabling dynamic and interactive operation of the measuring instrument delivered from the measuring instrument information providing server, and then, outputs a measurement result received from the measuring instrument terminal; and the measuring instrument terminal selects as a specified device a measuring object of a measuring instrument connected to the measuring instrument terminal in response to the operational command having specified a device from the user terminal, controls the measuring instrument, and then, delivers the measurement result of the device to the user terminal.

In the thus configured measuring instrument interactive demonstration system using a network, a user attempting to purchase a predetermined device or parts operates one's own user terminal, provides access to a device or parts manufacturer server, specifies a device, and inputs a test request.

Then, one's own user terminal is automatically connected to a measuring instrument information providing server that is a link destination.

The measuring instrument information providing server specifies a device or parts, and automatically connects one's own user terminal to a measuring instrument terminal that is a link destination.

The measuring instrument terminal carries out measurement while the device or parts specified based on remote operation of the user terminal is or are measured as measurement item(s).

In this way, the user can carry out a variety of tests of desired devices or parts by using one's own user terminal.

In order to achieve the foregoing object, according to the present invention, there is provided 9. an interactive demonstration system for a measuring instrument using a network according to the above 8, wherein the device or parts manufacturer server delivers charge payment information on the measuring instruments to the measuring instrument information providing server.

In the thus configured measuring instrument interactive demonstration system using a network, a device or parts manufacturer makes payment for measurement of devices or parts to an installer of the measuring instrument information providing server and measuring instrument terminal.

In order to achieve the foregoing object, according to the present invention, there is provided 10. an interactive demonstration system for a measuring instrument using a network, comprising:

first means for, in response to a request for providing demonstration information to a predetermined measuring instrument from a user terminal and a request for making operation, delivering to the user terminal via a network an operational program that contains demonstration information for enabling dynamic and interactive operation of the measuring instrument;

second means for causing the user terminal to deliver to a predetermined measuring instrument terminal via the network an operational command that contains demonstration information for dynamically and interactively operating the measuring instrument operated and inputted at the user terminal based on the operational program delivered by the first means;

third means for causing the measuring instrument terminal to control the predetermined measuring instrument connected to the measuring instrument terminal in response to the operational command that contains demonstration information for dynamically and interactively operating the measuring instrument delivered from the user terminal by the second means and to deliver a measurement result obtained by the measuring instrument to the user terminal via the network; and fourth means for causing the user terminal to output via the network the measurement result delivered from the measuring instrument by the second means.

In order to achieve the foregoing object, according to the present invention, there is provided 11. an interactive demonstration system using for a measuring instrument a network according to the above 10, wherein the first means has:

a storage section for storing an operational program that contains demonstration information for enabling dynamic and interactive operation of operational screen information representative of an operating portion for operating a predetermined measuring instrument connected to the measuring instrument terminal and the predetermined measuring instrument; and program delivery means for reading out the operational program from the storage portion in response to a request for providing demonstration information to the predetermined measuring instrument from the user terminal and a request for making operation, and then, delivering the program to the user terminal via the network.

In order to achieve the foregoing object, according to the present invention, there is provided 12. a program recording medium for interactive demonstration of a measuring instrument using a network having a program recorded therein, the program comprising:

first computer readable program coding means for, in response to a request for providing demonstration information to a predetermined measuring instrument from a user terminal and a request for making operation, delivering to the user terminal via a network an operational program that contains demonstration information for enabling dynamic and interactive operation of the measuring instrument;

second computer readable program coding means for causing the user terminal to deliver to a predetermined measuring instrument terminal via the network an operational command that contains demonstration information for dynamically and interactively operating the measuring instrument operated and inputted at the user terminal based on the delivered operational program;

third computer readable program coding means for causing the predetermined measuring instrument terminal to control the predetermined measuring instrument connected to the measuring instrument terminal in response to an operational command that contains demonstration information for dynamically and interactively operating the measuring instrument delivered from the user terminal and to deliver a measurement result obtained by the measuring instrument to the user terminal via the network; and fourth computer readable program coding means for causing the user terminal to output the measurement result delivered from the measuring instrument terminal via the network.

BRIEF DESCRIPTION OF DRAWINGS

FIG. 10 is a view illustrating the contents of description of a home page provided by a device or parts manufacturer server of FIG. 9.

BEST MODE OF CARRYING OUT OF THE INVENTION

Hereinafter, respective embodiments of the present invention will be described with reference to the accompanying drawings.

(First Embodiment)

Figure 1:
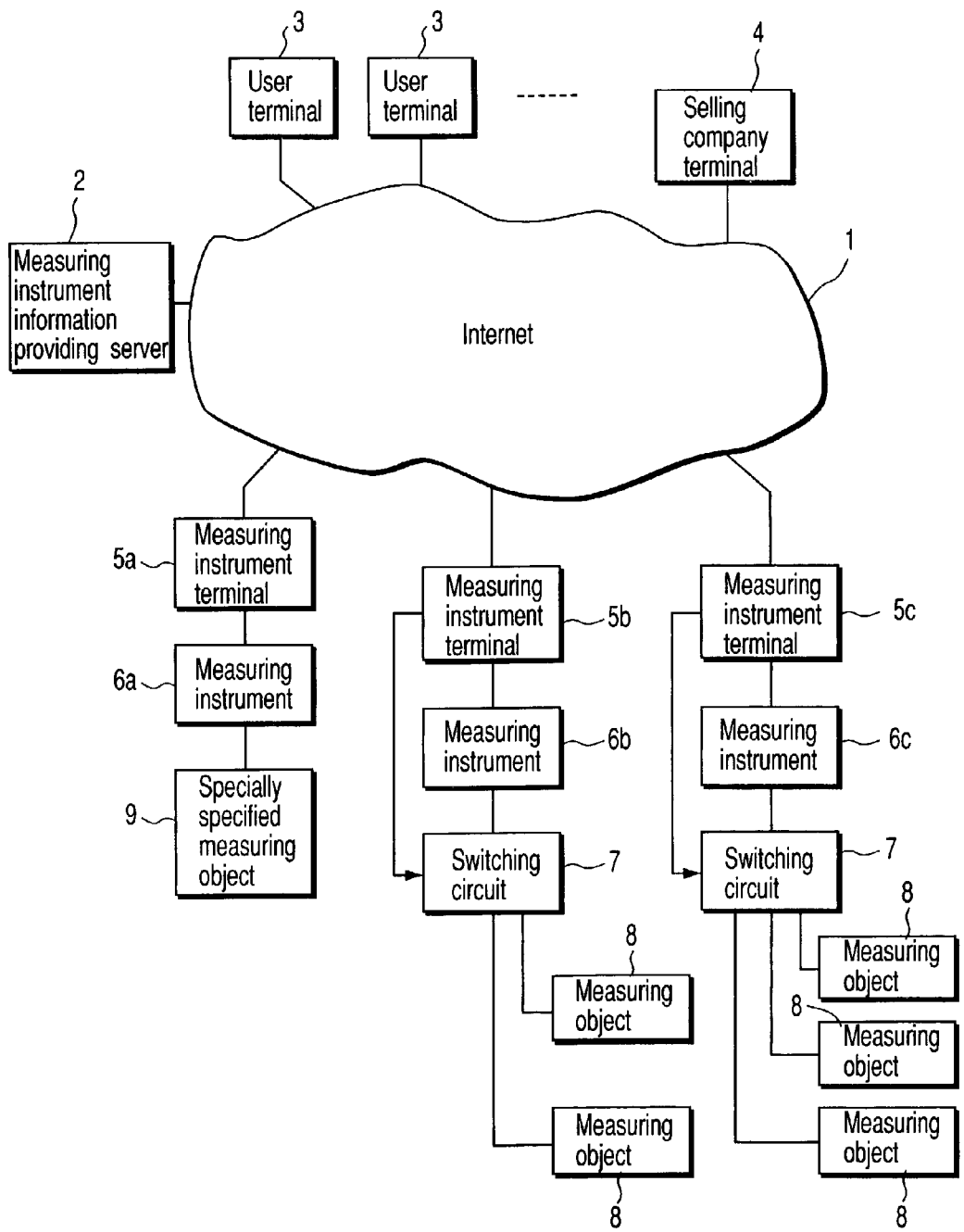
FIG. 1 is a schematic diagram showing a general configuration of a first embodiment to which an interactive demonstration method for a measuring instrument and system using a network according to the present invention are applied.

FIG. 1 is a schematic diagram showing a general configuration of a first embodiment to which an interactive demonstration method for a measuring instrument and system using a network according to the present invention are applied.

That is, as shown in FIG. 1, a measuring instrument information providing server 2, a plurality of user terminals 3, a selling company terminal 4, and three measuring instrument terminals 5a, 5b, and 5c, for example, are connected to an internet 1.

Individual measuring instruments 6a, 6b and 6c are connected to the measuring instrument terminals 5a, 5b, and 5c, respectively.

In an interactive demonstration system for a measuring instrument according to the present embodiment, the measuring instrument 6a is a measuring instrument that has special specifications specified by a customer (user).

In addition, the measuring instrument 6b is generally a commercially available W-CDMA signal measuring instrument.

Further, the measuring instrument 6c is generally a commercially available microwave signal measuring instrument.

To each of these generally commercially available measuring instruments 6b, 6c, a plurality of measuring objects 8 are connected via a switching circuit 7 in such a way that any of these objects can be selected.

This switching circuit 7 is controlled to execute switching by the corresponding measuring instrument terminal 5a, 5b.

One example of the measuring objects 8 is a W-CDMA RF chip or cellular phone, for example, where the measuring instrument 6b is a W-CDMA signal measuring instrument, for example.

In addition, another example of the measuring objects 8 is a microwave oscillator or microwave relay unit where the measuring instrument 6c is a microwave signal measuring instrument.

Figure 2:
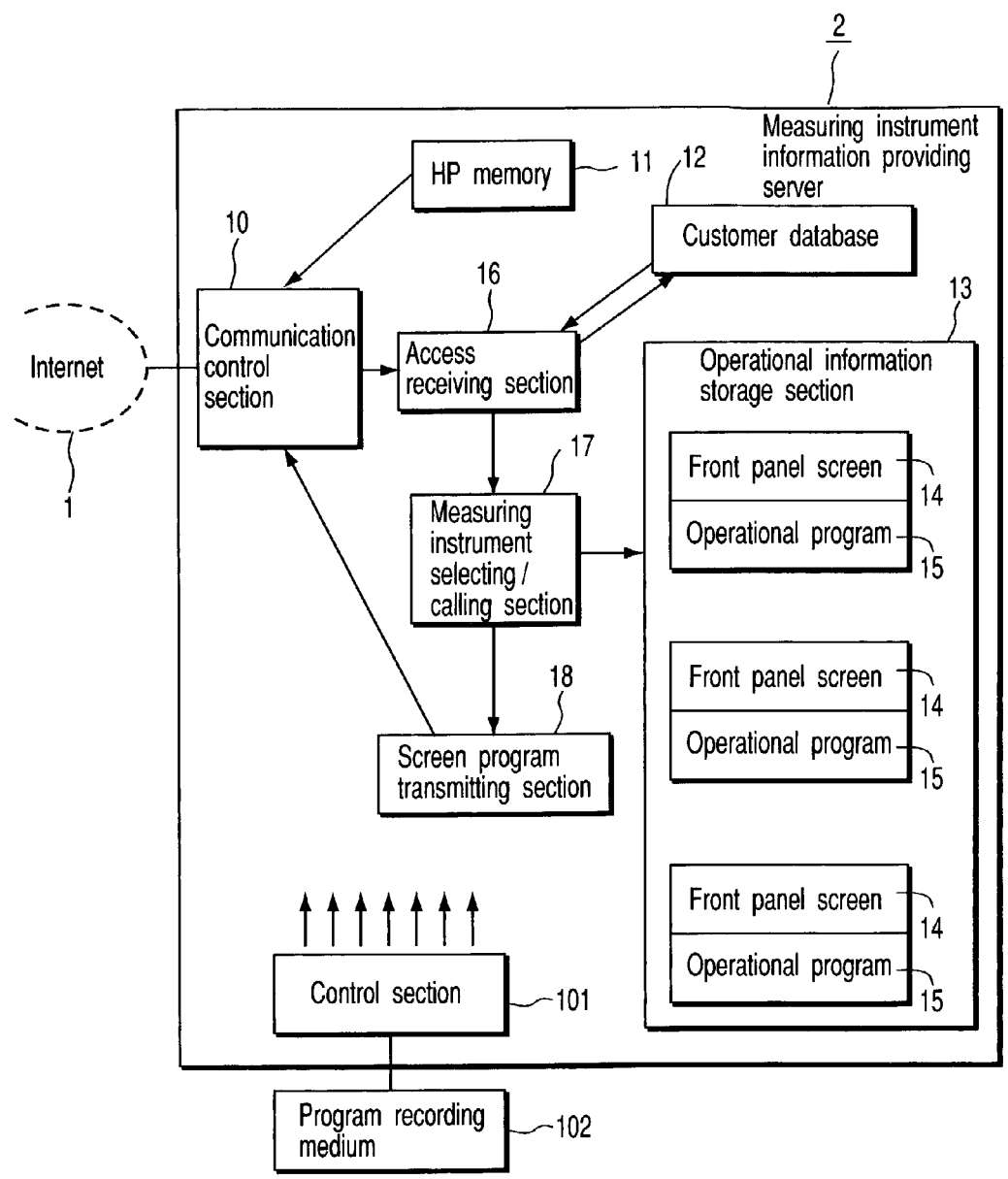
FIG. 2 is a block diagram depicting a general configuration of a measuring instrument information providing server of FIG. 1.

For example, the measuring instrument information providing server 2 composed of computers is configured as shown in FIG. 2.

In this measuring instrument information providing server 2, there are incorporated: a communication control section 10; a home page (HP) memory 11; a customer database 12; an operational information storage section 13; an access receiving section 16; a measuring instrument selecting/calling section 17; and a screen/program transmitting section 18.

Figure 3:
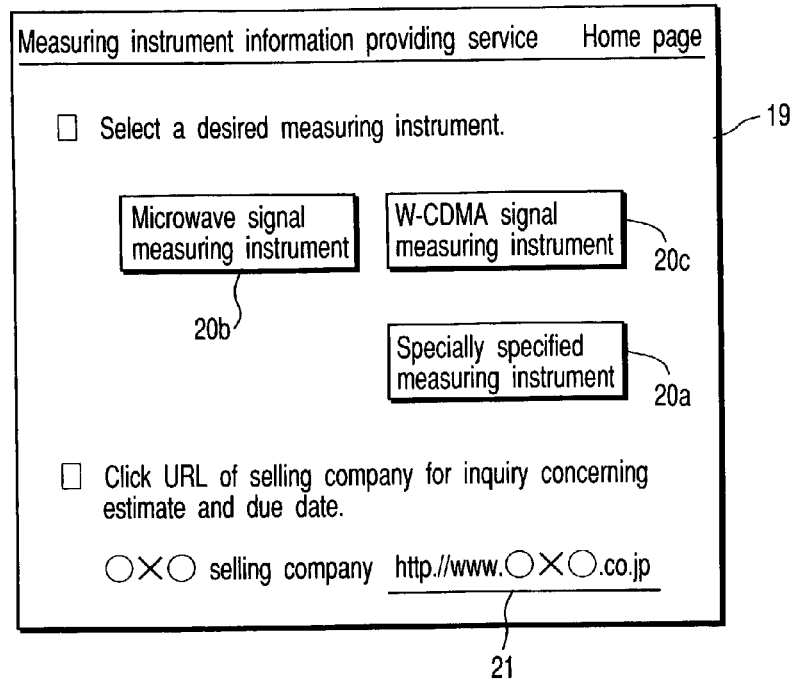
FIG. 3 is a view illustrating the contents of description of a home page provided by the measuring instrument information providing server of FIG. 1.

This measuring instrument information providing server 2 opens its own home page 19 as shown in FIG. 3, for example, stored in the home page (HP) memory 11 over the internet 1 by way of the communication control section 10 into which a browser is incorporated. In addition, this server accepts access to its own home page 19 from each of other terminals 3, 4, 5*a*, 5*b*, and 5*c*. Further, the server carries out information exchanges with the other terminals 3, 4, 5*a*, 5*b*, and 5*c*.

Here, the home page (HP) 19 as shown in FIG. 3 opened over the internet 1 is stored in the home page (HP) memory 11.

On this home page (HP) 19, there are displayed icons 20*a*, 20*b*, and 20*c* of the respective measuring instruments 6*a*, 6*b*, and 6*c* of which a user desires execution of operation. Further, there is displayed a URL (home page address) 21 of a selling company terminal 4 where the user makes an estimate or due date inquiry for the measuring instruments 6*a*, 6*b*, and 6*c*.

In the operational information storage section 13 shown in FIG. 2, there are stored, for each of the measuring instruments 6*a*, 6*b*, and 6*c* connected to the respective measuring instrument terminals 5*a*, 5*b*, and 5*c*, a front panel screen 14 that is an operating screen for the user to remotely operate each of the measuring instruments 6*a*, 6*b*, and 6*c* at the user terminal 3 via the internet 1 and the corresponding measuring instrument terminal 5*a*, 5*b*, or 5*c*; and an operational program 15 for the user to remotely operate each of the measuring instruments 6*a*, 6*b*, and 6*c* at the user terminal 3 via the front panel screen 14.

In this operational program 15, there is contained demonstration information for enabling dynamic and interactive operation including measurement items, measuring conditions or the like of interest of the user (person who wants to purchase the instrument) in response to a request for providing demonstration information on a predetermined measuring instrument 6 from the user terminal 3 and a request for making operation.

A control section 101 shown in FIG. 2 controls each section contained in the above described measuring instrument information providing server 2 based on a program recorded in a program recording medium 102, as described later.

Figure 4:
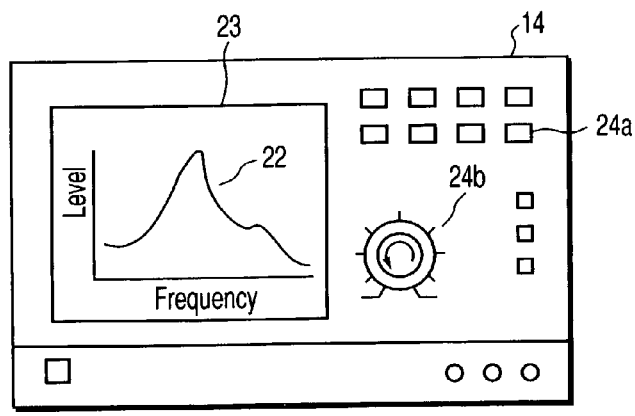
FIG. 4 is a view illustrating the contents displayed on a front panel screen to be downloaded from the measuring instrument information providing server of FIG. 1 to a user terminal.

The front panel screen 14 shown in FIG. 4 schematically illustrates a front panel of actual measuring instruments 6*a*, 6*b*, and 6*c*.

That is, inside this front panel screen 14 there are displayed a display frame 23 that is a data display area for displaying a measurement result 22; an operating icon 24*a* that is an operating portion schematically illustrating various kinds of operational buttons; an operating icon 24*b* schematically illustrating an operational knob; and the like.

Where the user remotely operates a desired measuring instrument by using this front panel 14 at one's own user terminal 3, the operating icon 24*a* is clicked by the mouse, or in the case of an operating icon 24*b* of the operating knob, a start position or an end position in a rotational direction is repeatedly clicked by the mouse, and the operating knob is virtually rotated.

The operational program 15 converts a clicking operation of each of the operating icons 24*a* and 24*b* on the front panel screen 14 by the user into data on normal operation command, and transmits the converted data to the measuring instrument terminal 5*a*, 5*b*, or 5*c* during line connection. In addition, a measurement result 22 received from the measuring instrument terminal 5*a*, 5*b*, or 5*c* is graphically displayed on the display frame 23 of the front panel screen 14.

In this manner, there is executed an operational program 15 that contains demonstration information for dynamically and interactively operating the measuring instrument including measurement items, measuring conditions or the like of the user's interest concerning the measuring instrument.

In FIG. 2, the address (home), name, occupation, address (business), E-mail address and the like of each user who accesses to this measuring instrument information providing server 2 are stored in the customer database 12.

In addition, if an access to the home page 19 from the user terminal 3 occurs, the access receiving section 16 checks a user that is an access source by using the customer database 12, and specifies a measuring instrument 6 for the user's request for making operation.

The measuring instrument selecting/calling section 17 reads out the front panel screen 14 and operational program 15 that correspond to the measuring instrument specified from the operational information storage section 13.

The screen/program transmitting section 18 downloads the front panel screen 14 and operational program 15 read out from the operational information storage section 13 to the user terminal 3 in access to the home page 19.

Figure 5:
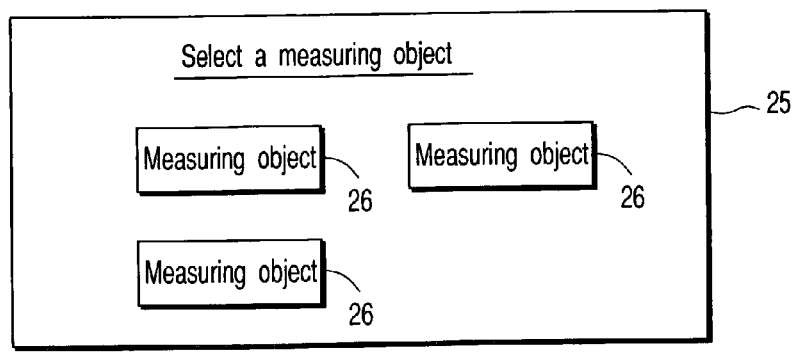
FIG. 5 is a view illustrating the contents of description of a home page at the measuring instrument terminal of FIG. 1.

In FIG. 1, for example, the measuring terminals 5*a*, 5*b*, and 5*c* composed of computers each also have a URL and a home page 25 as shown in FIG. 5, for example.

A selection icon 26 of a measuring object 8 connected to the measuring instrument 6*a*, 6*b*, or 6*c* operated by oneself is displayed on this home page 25.

When one measuring object 8 is specified from the user terminal 3 being connected to the measuring instrument terminal 5*b* or 5*c* by clicking operation for the selection icon 26, the measuring instrument terminals 5*b* or 5*c* connects the measuring object 8 specified by controlling the switching circuit 7 to switch to the measuring instrument 6*b* or 6*c*.

Only one specially specified measuring object 9 is connected to the measuring instrument 6*a*, and thus, no switching control is carried out.

The measuring instrument terminal 5*a*, 5*b*, or 5*c* applies an operational command signal to measuring instrument 6*a*, 6*b*, or 6*c* connected to its own terminal based on an operational command inputted from the user terminal 3 being connected to its own, and operate the measuring instrument 6*a*, 6*b*, or 6*c*.

A measurement result 22 of the measuring object 8 or 9 outputted from the measuring instruments 6*a*, 6*b*, or 6*c* is returned from each of the measuring instrument terminal 5*a*, 5*b*, or 5*c* to the user terminal 3 that is an access source via the internet 1.

In FIG. 1, for example, in each user terminal 3 composed of commercially available personal computers (PC), there is incorporated a browser for accessing a variety of home pages opened over the Internet 1.

Further, in FIG. 1, for example, the selling company terminal 4 composed of computers also has a URL and a home page, and responds to an estimate or due date inquiry from the user terminal 3 via the internet 1.

Furthermore, in FIG. 1, in a program recording medium 102, there is recorded, as a program for interactive demonstration of a measuring instrument using a network, a program comprising: first computer readable program coding means for, in response to a request for providing demonstration information on a predetermined measuring instrument from a user terminal and a request for making operation, delivering to the user terminal via a network an operational program that contains demonstration information for enabling dynamic and interactive operation of the measuring instrument; second computer readable program coding means for causing the user terminal to deliver to a predetermined measuring instrument terminal via the network an operational command that contains demonstration information for dynamically and interactively operating the measuring instrument operated and inputted at the user terminal based on the delivered operational program; third computer readable program coding means for causing the measuring instrument terminal to control the predetermined measuring instrument connected to the measuring instrument terminal in response to the operational command that contains demonstration information for dynamically and interactively operating the measuring instrument delivered from the user terminal and to deliver a measurement result obtained by the measuring instrument to the user terminal via the network; and fourth computer readable program coding means for causing the user terminal to output the measurement result delivered from the measuring instrument terminal via the network, for example.

Now, a detailed operation of the measuring instrument information providing server 2, the user terminal 3, and the measuring instrument terminals 5a, 5b, and 5c in the thus configured measuring instrument interactively demonstrating system using a network according to the present invention, will be described with reference to a flow chart.

Figure 6:
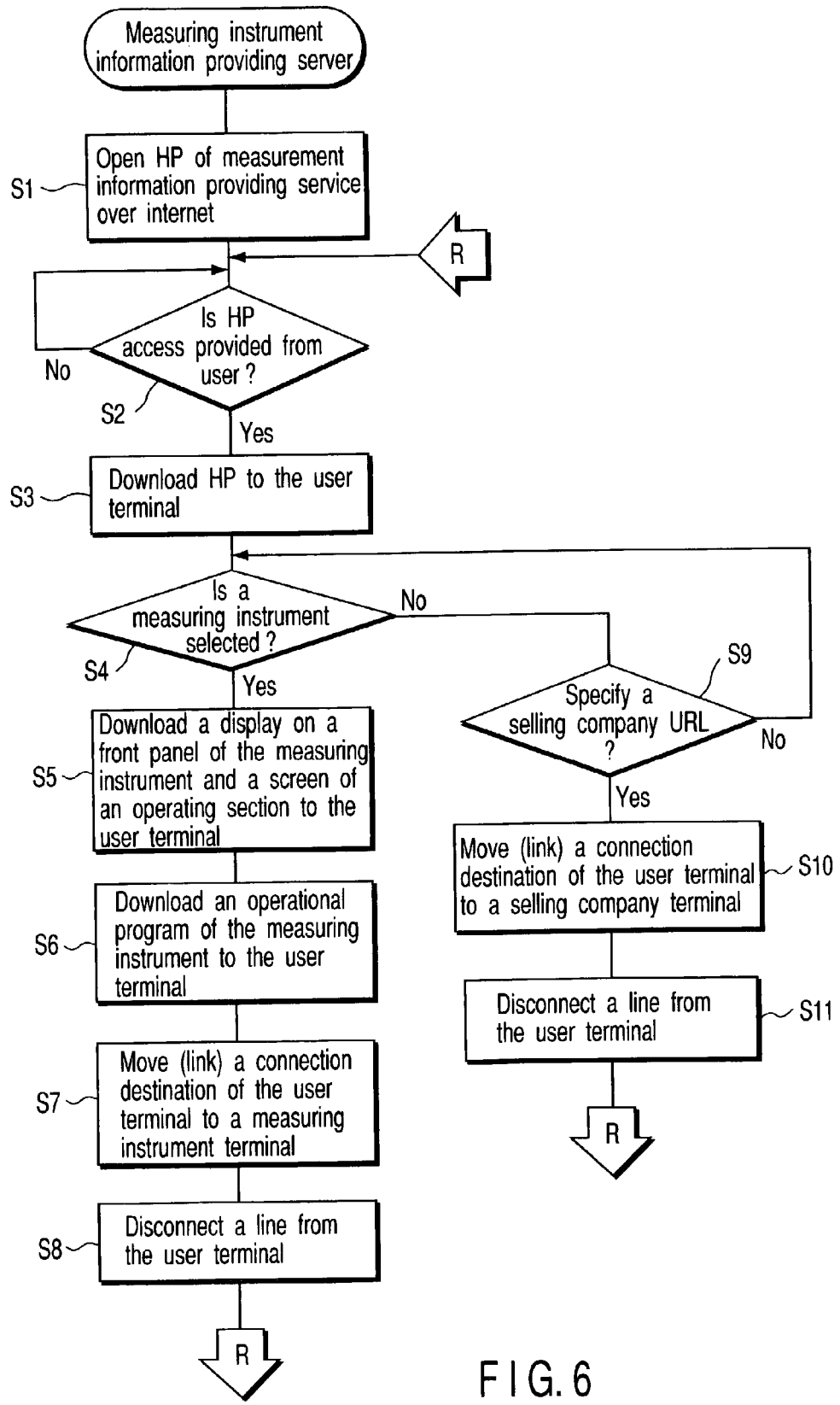
FIG. 6 is a flow chart presented to explain a detailed operation of the measuring instrument information providing server of FIG. 1.

FIG. 6 is a flow chart showing an operation of the measuring instrument information providing server 2.

First, when a power source (not shown) of the measuring instrument information providing server 2 is turned ON, the home page 19 shown in FIG. 3 read out from the home page memory 11 is opened over the internet 1 (step S1).

If an access occurs to a URL of this home page 19 from one user terminal 3 (step S2), this home page 19 is downloaded to the user terminal 3 that is an access source (step S3).

When any one of selection icons 20a, 20b, and 20c of the measuring instruments 6a, 6b, and 6c desired by the user on the home page 19 is selected at one's own user terminal 3 (step S4), the front panel image 14 and the operational program 15 of the selected measuring instrument 6a, 6b or 6c inside the operational information storage section 13 are read out, and are downloaded to the user terminal 3 (steps S5 and S6).

Next, a connection destination of the user terminal 3 is moved to (linked with) each of the measuring instrument terminals 5a, 5b, or 5c of the selected measuring instrument 6a, 6b, or 6c (step S7).

Then, a line is disconnected from the user terminal 3 (step S8).

If none of the selection icons 20a, 20b, and 20c of a measuring instrument is selected at the step S4 and if a URL21 of the selling company terminal 4 is specified at the step S9, the connection destination of the user terminal 3 is moved to (linked with) the selling company terminal 4 (step S10).

Then, a line is disconnected from the user terminal 3 (step S11).

Figure 7:
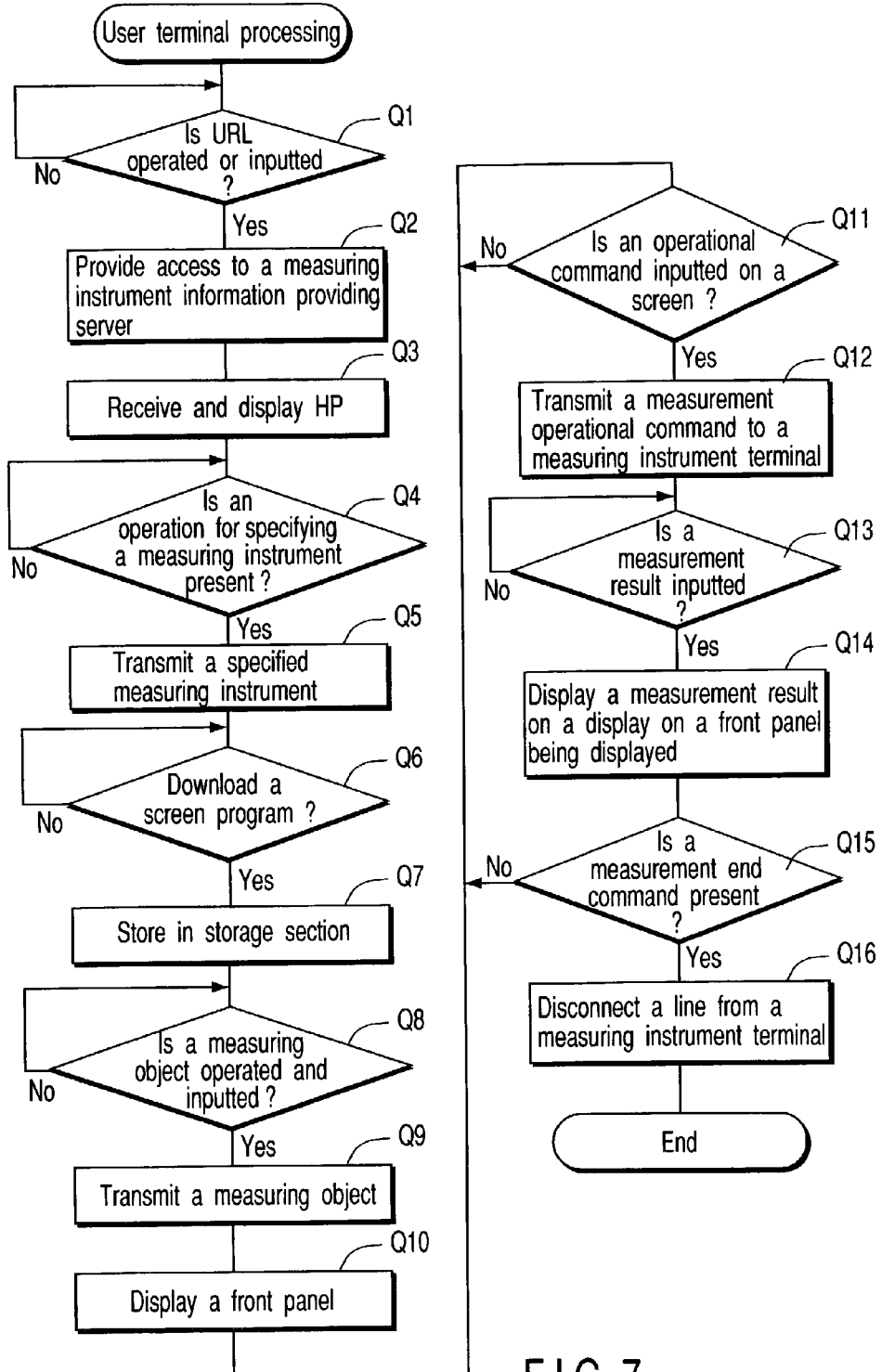
FIG. 7 is a flow chart presented to explain a detailed operation of the user terminal of FIG. 1.

If a power source (not shown) is turned ON at the user terminal 3, remote operation is carried out for a measuring instrument in accordance with a flow chart shown in FIG. 7.

When the user inputs a URL of a measuring instrument information providing server 2 by one's own user terminal 3 (step Q1), the home page 19 of the measuring instrument information providing server 2 over the internet 1 is accessed by this user (step Q2).

Then, the home page 19 received at its own user terminal 3 is displayed on, and is outputted to, a display (not shown) of its own user terminal 3 (step Q3).

When the user specifies the measuring instrument 6a, 6b, or 6c on this home page 19 (step Q4), the specified measuring instrument is transmitted to the measuring instrument information providing server 2 (step Q5).

Next, when the front panel screen 14 and the operational program 15 of the measuring instrument 6a, 6b, or 6c specified by oneself are downloaded from the measuring instrument information providing server 2 (step Q6), the user terminal 3 temporarily stores and maintains the downloaded front panel screen 14 and operational program 15 in a storage section (not shown) of the user terminal 3 (step Q7).

When the thus downloaded front panel screen 14 and operational program 15 have been received, the connection destination of its own user terminal 3 is switched to the measuring instrument terminal 5a, 5b, or 5c of the specified measuring instrument 6a, 6b, or 6c.

Therefore, in this state, the home page 25 as shown in FIG. 5, the home page being downloaded from the measuring instrument terminal 5a, 5b, or 5c that is a connection destination, is displayed on the display (not shown) of its own user terminal 3.

Subsequently, operation is executed in accordance with an operational program stored in the storage section (not shown) of its own user terminal 3.

When the user specifies the measuring object 8 or 9 on the home page 25 by the selection icon 26 (step Q8), the specified measuring object 8 or 9 is transmitted to the measuring instrument terminal 5a, 5b, or 5c that is a connection destination (step Q9).

When the measuring object 8 or 9 has been selected, the front panel screen 14 of the measuring instrument 6a, 6b, or 6c stored in the storage section (not shown) of its own user terminal 3 is displayed on, and is outputted to, the display (not shown) of its own user terminal 3 as shown in FIG. 4 (step Q10).

When the user inputs an operational command to the measuring instrument 6a, 6b, or 6c by using the operational icon 24a or 24b on this displayed front panel screen 14 (step Q11), this operational command is transmitted to the measuring instrument terminal 5a, 5b, or 5c of the connection destination (step Q12).

When the measurement result 22 of the measuring object 8 is inputted from the measuring instrument terminal 5a, 5b, or 5c of the connection destination (step Q13), this measurement result 22 is graphically displayed in the display frame 23 of the front panel screen 14 (step Q14).

When the user operates and inputs a measurement end command (step Q15), the measurement end command is transmitted to the measuring instrument terminal 5a, 5b, or 5c of the connection destination. Then, a line to the associated measuring instrument terminal 5a, 5b, or 5c is disconnected (step Q16).

Figure 8:
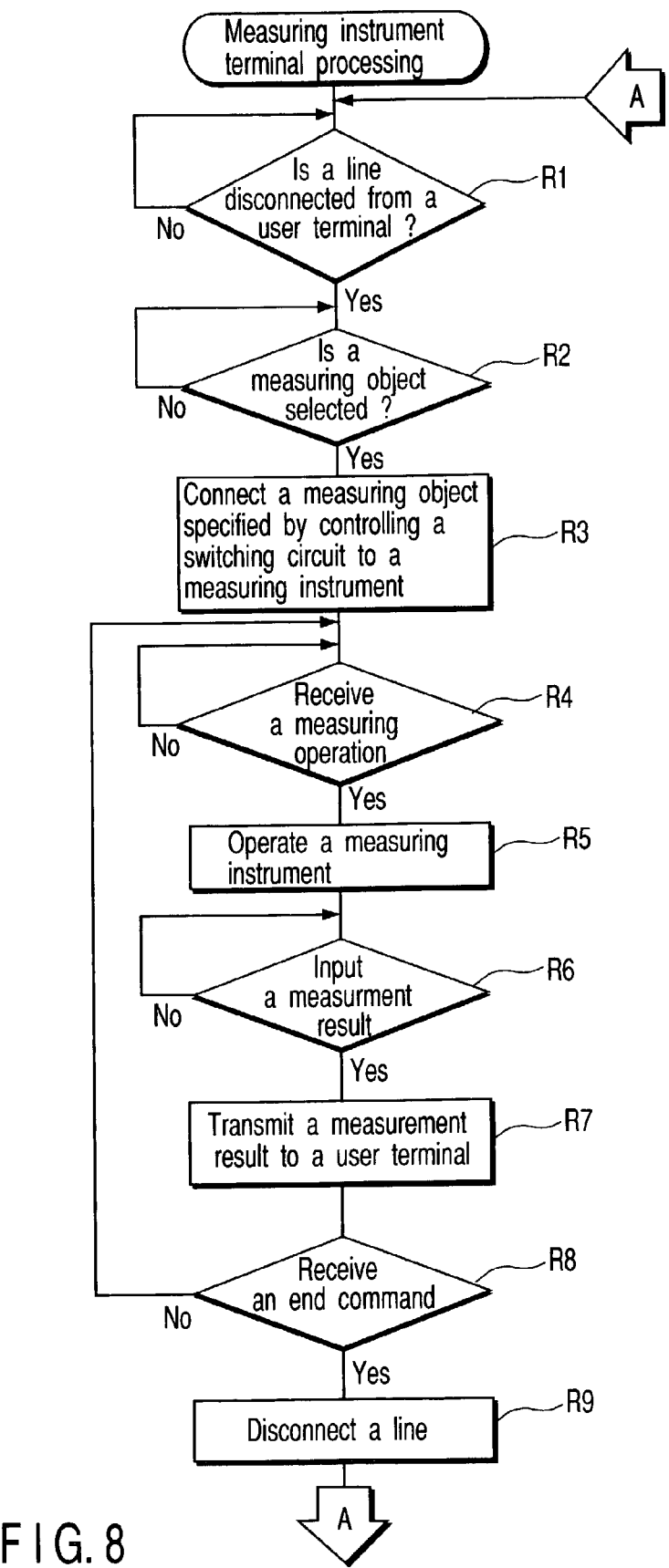
FIG. 8 is a flow chart presented to explain a detailed operation of the measuring instrument terminal of FIG. 1.

When the power source (not shown) is turned ON, measuring instrument terminals 5a, 5b, and 5c each carry out measurement processing for the measuring instruments 6a, 6b, and 6c each in accordance with a flow chart shown in FIG. 8.

After a line has been connected with a user terminal 3 that is an operation execution request source of the measuring instrument 6a, 6b, or 6c (step R1), when the measuring object 8 is selected by the user terminal 3 (step R2), the measuring instrument terminals 5a, 5b, and 5c each control a switching circuit 7 to perform switching, and connects the specified measuring object 8 to the measuring instrument 6a, 6b, or 6c operated by the measuring instrument terminal 5a, 5b, or 5c (step R3).

When a measurement operational command is inputted from the user terminal 3 (step R4), each measuring instrument 5a, 5b, or 5c operates the measuring instrument 6a, 6b, or 6c.

Specifically, each measuring instrument terminal 5a, 5b, or 5c applies a measurement specification signal to the measuring instrument 6a, 6b, or 6c (step R5).

As a result, the measuring instrument 6a, 6b, or 6c carries out measurement under measurement items and measuring conditions specified by an operational command for the measuring object 8 connected to its own, and delivers the measurement result 22 to the measuring instrument terminal 5a, 5b, or 5c.

When the measurement result 22 is inputted from the measuring instrument 6a, 6b, or 6c (step R6), each measuring instrument terminal 5a, 5b, or 5c transmits this measurement result 22 to the user terminal 3 (step R7).

Next, unless a measurement end command has been received from the user terminal 3 (step R8), each measuring instrument terminal 5a, 5b, and 5c returns to the step R4, and waits for a next measurement command operation.

Then, when a measurement end command is received from the user terminal 3 (step R8), the measuring instrument terminal 5a, 5b, or 5c terminates measuring operation of the measuring instruments 6a, 6b, and 6c, and disconnects a line from the user terminal 3 (step R9).

In the thus configured measuring instrument demonstrating system using a network, the user operates its own user terminal 3 connectable with the network 1 where a commercially available browser is incorporated in a commercially available personal computer, and provides access to the home page 19 of the measuring instrument information providing server 2, and specifies the measuring instrument 6a, 6b, or 6c, thereby inputting a request for making operation for the measuring instrument 6a, 6b, or 6c.

Then, the front panel image 14 and operational program 15 as shown in FIG. 4 for operating the measuring instrument 6a, 6b, or 6c are downloaded from this measuring instrument information providing server 2 to its own user terminal 3.

With a link function of the measuring instrument information providing server 2, its own user terminal 3 is automatically connected to the measuring instrument terminal 5a, 5b, or 5c to which its own specified measuring instrument 6a, 6b, or 6c is connected.

Actual measuring instruments 6a, 6b, and 6c which are operable by one's own are connected to the measuring instrument terminals 5a, 5b, and 5c, respectively.

The front panel image 14 having the operating icons 24a and 24b and the display frame 23 of the measuring instrument 6a, 6b, or 6c specified by the user, is displayed at the user terminal 3.

The user remotely operates the measuring instrument 6a, 6n, or 6c specified by operation for mouse clicking the operating icons 24a and 24b in the front panel image 14 displayed at its own user terminal 3 via the internet 1 and the measuring instrument terminal 5a, 5b, or 5c.

Further, the measurement result 22 caused by the user specified measuring instrument 6a, 6b, or 6c is displayed in the display frame 23 of the front panel image 14 of its own user terminal 3.

In this way, the user can carry out remote operation by specifying arbitrary measurement items and measuring conditions for target measuring instrument 6a, 6b, or 6c with a feeling of visually operating the operating panel of the actual measuring instrument 6a, 6b, or 6c at its own user terminal 3.

In addition, the user can, of course, arbitrarily select the measuring instrument 6a, 6b, or 6c targeted to be operated from its own user terminal 3, and can arbitrarily select the measuring object 8 of the selected measuring instrument 6a, 6b, or 6c.

(Second Embodiment)

Figure 9:
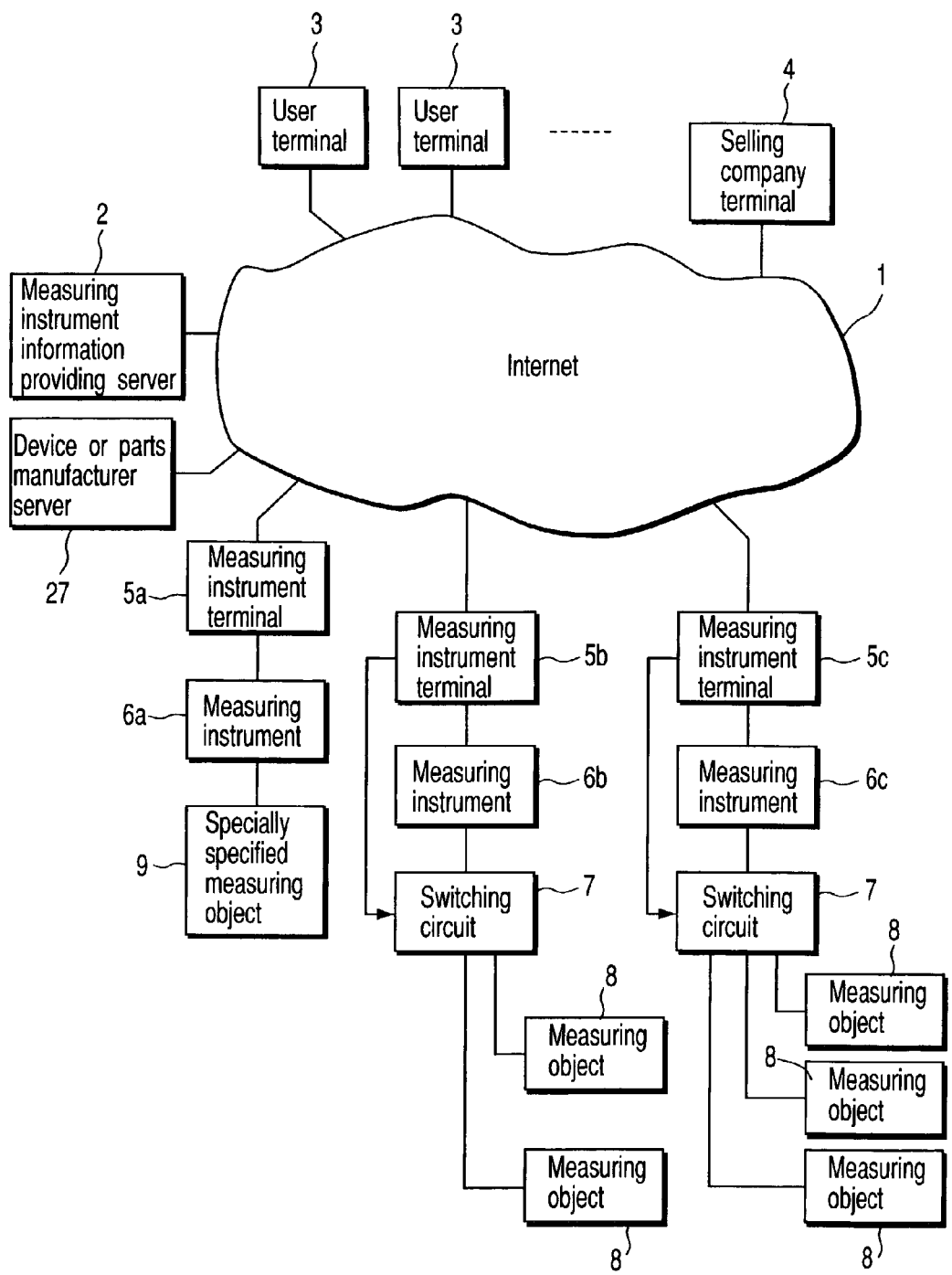
FIG. 9 is a connection diagram schematically showing a general configuration of a second embodiment to which an interactive demonstration method for a measuring instrument and system using a network according to the present invention are applied.

FIG. 9 is a connection diagram schematically showing a general configuration of an interactive demonstration system for a measuring instrument using a network according to a second embodiment of the present invention.

In FIG. 9, like reference numerals designate like elements in the measuring instrument interactively demonstrating system using a network according to the first embodiment of the present invention. A detailed description of duplicate elements is omitted.

In the interactive demonstration system for the measuring instrument using the network according to the present embodiment, a device or parts manufacturer server 27 is further connected to the Internet 1 in the system according to the first embodiment shown in FIG. 1.

The device or parts manufacturer server 27 composed of computers has a URL and a home page 28 for product introduction as shown in FIG. 10, for example.

On this home page 28, there is described a URL 30 of the previously described measuring instrument information providing server 2 that provides measurement service to customers (users) who desire execution of testing the device or parts 29 together with introduction of devices or parts 29 that are products of the device or parts manufacturer.

Figure 11:
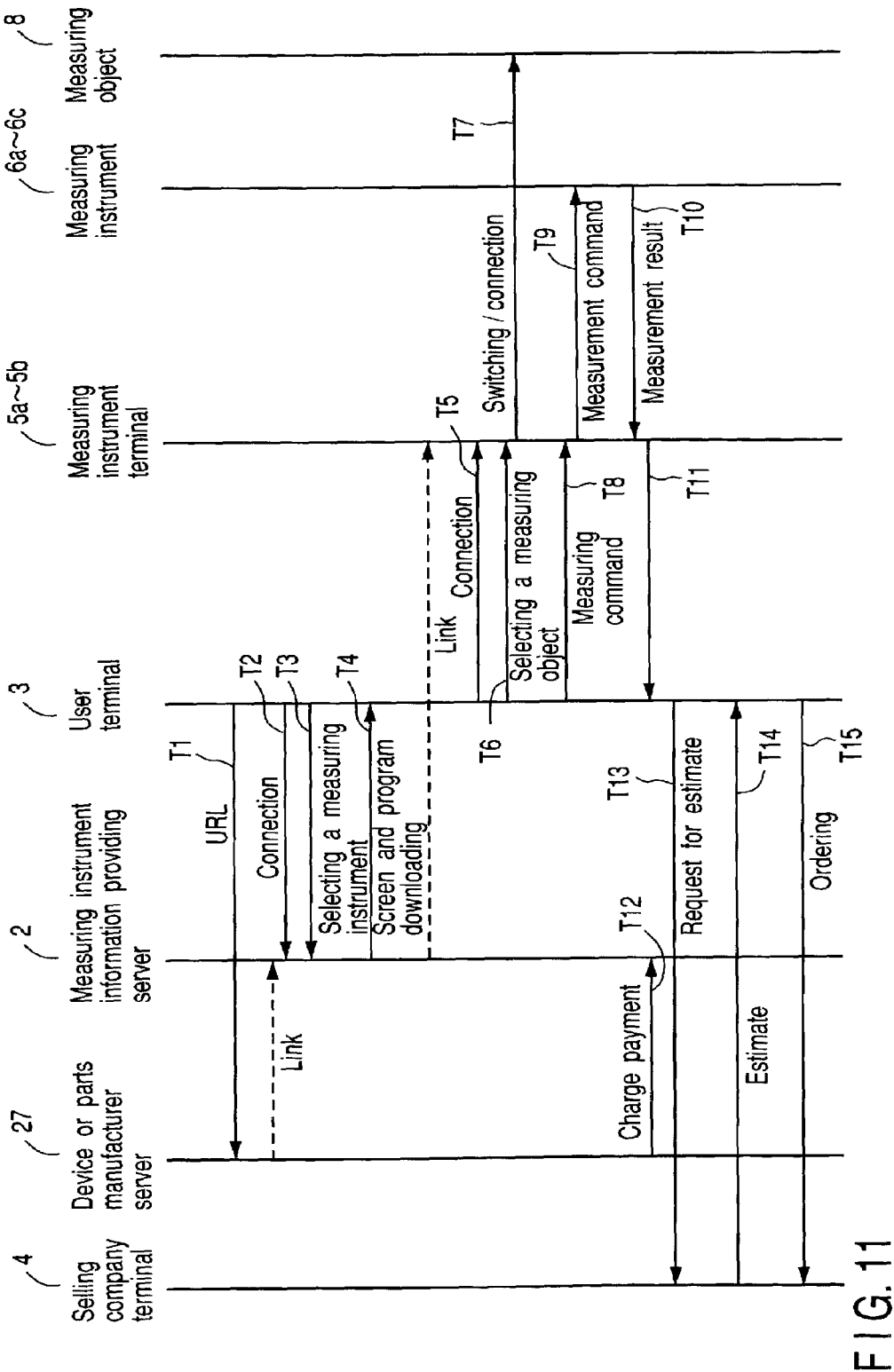
FIG. 11 is a sequence chart presented to explain an operation of each section of FIG. 9.

Now, an operation of each section in the thus configured measuring instrument interactively demonstrating system using a network according to the second embodiment will be described with reference to a sequence chart shown in FIG. 11.

First, a user specifies a URL from its own user terminal 3, and provides access to a home page 28 of the device or parts manufacturer server 27 (timing T1).

When the user specifies a device or parts 29, and then, specifies (clicks) the URL 30 of the measuring instrument information providing server 2, the connection destination of the user terminal 3 is changed to (linked with) the measuring instrument information providing server 2 (timing T2).

When the user specifies the measuring instrument 6a, 6b, or 6c on the home page 19 of the measuring instrument information providing server 2 by its own user terminal 3 (timing T3), the front panel screen 14 and the operational program 15 of the measuring instrument 6a, 6b, or 6c specified from the measuring instrument information providing server 2 are downloaded to its own user terminal 3 (timing T4).

Then, the connection destination of the user terminal 3 is changed to (linked with) the measuring instrument terminal 5a, 5b, or 5c of the specified measuring instrument 6a, 6b, or 6c (timing T5).

On the home page 25 of the measuring instrument terminal 5a, 5b, or 5c, when the measuring object 8 is automatically selected as the device or parts 29 specified on home page 28 of the device or parts manufacturer server 27 (timing T6), the measuring object 8 of the specified device or parts 29 is automatically connected to the measuring instrument 6a, 6b, or 6c (timing T7).

In this state, a measurement operational command is transmitted from the user terminal 3 to the measuring instrument terminal 5a, 5b, or 5c based on the user operation (timing T8).

As a result, when a measuring command is delivered from the measuring instrument terminal 5a, 5b, or 5c to the measuring instrument 6a, 6b, or 6c (timing T9), a measurement result 22 of the device or parts 29 (measuring object 8) specified from the measuring instrument 6a, 6b, or 6c is returned (timing T10).

The measuring instrument terminal 5a, 5b, or 5c returns this measurement result 22 to the user terminal 3.

The user terminal 3 displays the measurement result 22 in the display frame 23 of the front panel screen 14 (timing T11).

At a stage when a series of measuring processes terminate, charge payment information is transmitted from the device or parts manufacturer server 27 to the measuring instrument information providing server 2.

Next, where the user purchases the device 29 by referring to the measurement result 22 of the device or parts 29, the user access a home page of the selling company terminal 4, and delivers an estimate request (timing T13).

When an estimate is transmitted from the selling company terminal 4 to the user terminal 3 (timing T14), the user orders the device 29 to the selling company terminal 4 via the user terminal 3 based on this estimate (timing T15).

In the thus configured measuring instrument interactively demonstrating system using a network according to the second embodiment, a user attempting to purchase the device 29 developed by the device or parts manufacturer operates one's own user terminal 3, accesses the home page 28 of the device or parts manufacturer server 27, specifies the device or parts 29, and inputs a test request.

Then, one's own user terminal 3 is automatically connected (linked) to the home page 19 of this measuring instrument information providing server 2

Then, when the measuring instrument 6a, 6b, or 6c is specified on the home page 19 of the measuring instrument information providing server 2, its own user terminal 3 is automatically connected to the measuring instrument terminal 5a, 5b, or 5c that is a link destination.

The measuring terminal 5a, 5b, or 5c carries out measurement by the measuring instrument 6a, 6b, or 6c with the device 29 being specified as a measuring object 8 based on the user remote operation at the user terminal 3.

In this way, the user can arbitrarily carry out a variety of tests of the desired device or parts 29 by using its own user terminal 3.

Further, the device or parts manufacturer makes payment for measurement of device or parts 29 to an installer of the measuring instrument information providing server and measuring instrument terminal.

In this manner, for a manufacturer of the measuring instrument 6a, 6b, and 6c and a manufacturer of the device or parts 29 targeted for measurement, it is possible to provide a measuring instrument demonstrating system which is the most effective in selling strategy.

As described above, in the interactive demonstration system for the measuring instrument and system using a network according to the present invention, demonstration information concerning demonstration of a variety of measuring instruments developed by a manufacturer of the measuring instrument is informed to users (persons who want to purchase the instruments). In addition, an operational program for enabling operation of the measuring instrument is delivered to a user terminal via a network according to each user access so as to acquire dynamic and interactive demonstration information including measurement items or measuring conditions and the like of the user's interest concerning the measuring instrument.

Each user operates and inputs demonstration data for dynamic and interactive demonstration including measurement items or measuring conditions and the like of one's own interest in a desired measuring instrument with its own user terminal having general specifications, the user terminal being connectable to a network, thereby making it possible to grasp demonstration of the measuring instrument at one's own terminal.

In addition, at the provider who demonstrates the measuring instrument as well, dynamic and interactive demonstration information including measurement items, measuring conditions or the like of the interest of the user (person who wants to purchase the instrument) concerning the measuring instrument, can be automatically provided to the user for the purpose of demonstration of predetermined measuring instrument, and the service provided to users can be improved.

Therefore, as has been described above, according to the present invention, there can be provided an interactive demonstration method for a measuring instrument and system using a network so as to let a user (person who wants to purchase a instrument) know demonstration information concerning demonstration of a variety of measuring instruments developed by a measuring instrument manufacturer via a network and to achieve dynamic and interactive acquisition of demonstration information including measurement items, measuring conditions or the like of the user's interest concerning the measuring instrument.

The invention claimed is:

1. A interactive demonstration method for a measuring instrument using a network, comprising the steps of:

identifying a user obtaining access to a measuring instrument information providing server from a user terminal of the user on the basis of a customer database incorporated in the measuring instrument information providing server and specifying a predetermined measuring instrument with respect to which the user makes the request for operation;

in response to a request for providing demonstration information on a predetermined measuring instrument from a user terminal and a request for making operation, delivering to the user terminal via a network an operational program that contains demonstration information for measuring properties of a desired electronic device including at least one of electronic equipment and electronic parts thereby switch-connecting the desired object to be measured to the predetermined measuring instrument;

causing the user terminal to deliver to a predetermined measuring instrument terminal via the network an operational command that contains measurement items and measuring conditions of the user's interest which are operated and inputted at the user terminal, in addition to the demonstration information in order to measure the properties of the desired object to be measured, thereby switch-connecting the desired object to be measured to the predetermined measuring instrument based on the delivered operational program;

causing the measuring instrument terminal to control the predetermined measuring instrument connected to the measuring instrument terminal in response to the operational command that contains demonstration information including measurement items and measuring conditions of the user's interest which is output from the user terminal in order to measure the properties of the desired object to be measured, thereby switch-connecting the desired object to be measured to the predetermined measuring instrument, and to deliver a measurement result obtained by the measuring instrument to the user terminal via the network; and causing the user terminal to output the measurement result delivered from the measuring instrument terminal via the network.

2. An interactive demonstration system for a measuring instrument using a network, comprising:

a measuring instrument terminal;

a measuring instrument information providing server; and a user terminal, each of which is connected to a network, wherein the measuring instrument information providing server includes: storage means for storing an operational program that contains demonstration information including measurement items and measuring conditions of the user's interest for enabling an operational screen representative of an operating portion for operating the predetermined measuring instrument connected to the measuring instrument terminal, and also measuring properties of a desired electronic device including at least one of electronic equipment and electronic parts, thereby switch-connecting the desired object to be measured to the predetermined measuring instrument;

a customer database which stores customer information on users which have gotten access to the measuring instrument information providing server, means for identifying a user obtaining access to the measuring instrument information providing server from the user terminal on the basis of the customer database, and specifying a predetermined measuring instrument with respect to which the user makes a request for operation, and program delivery means for reading out from the storage means the operational program that contains the demonstration information for measuring the properties of the desired object to be measured, thereby switch-connecting the desired object to be measured to the predetermined measuring instrument in response to a request for providing the demonstration information including the measurement items and the measuring conditions of the user's interest on the predetermined measuring instrument from the user terminal and a request for making operation, and then, delivering the program to the user terminal via the network;

the user terminal including:

a terminal screen and a terminal operating portion;

operation execution request delivery means for delivering the request for providing demonstration information including measurement items and measuring conditions of the user's interest on the predetermined measuring instrument and a request for making operation to the measuring instrument information providing server via the network;

program execution means for executing the operational program that contains the demonstration information including the measurement items and the measuring conditions of the user's interest for measuring the properties of the desired object to be measured, thereby switch-connecting the desired object to be measured to the predetermined measuring instrument, the information being delivered from the measuring instrument information providing server, thereby making it possible to visualize an operation face of the measuring instrument on the terminal screen and to operate the operation face at the terminal operating portion;

means for selecting the desired object to be measured from one or more objects connected to the predetermined measurement instrument;

means for delivering an operational command operated and inputted at the terminal Operating portion to the measuring instrument terminal via the network, thereby causing desired measurement by the predetermined measuring instrument connected to the measuring instrument terminal; and means for outputting a measurement result received from the measuring instrument terminal via the network, and said measuring instrument terminal has means for controlling the predetermined measuring instrument connected to the measuring instrument terminal, and measuring the properties of the desired object to be measured, thereby switch-connecting the desired object to be measured to the predetermined measuring instrument in response to the operational command from the user terminal and delivering the measurement result obtained by the measuring instrument to the user terminal via the network.

3. An interactive demonstration system for a measuring instrument using a network according to claim 2, wherein, the measuring instrument information providing server has plural types of information on measuring instruments stored and when an operation execution request inputted from the user terminal while any measuring instrument monitoring information on the measuring instrument can be selected specifies a specific measuring instrument by providing access from the user terminal, the measuring instrument information providing server delivers to the user terminal an operational screen and an operational program that correspond to the measuring instrument, and instructs the user terminal to be connected to the measuring instrument terminal to which the measuring instrument has been connected.

4. An interactive demonstration system for a measuring instrument using a network according to claim 3, wherein the measuring instrument information providing server includes a customer database regarding a user who gains access to the measurement instrument information providing server, and when an access from a terminal of the user occurs, the measuring instrument information server identifies the user from the database and specifies a measuring instrument specified by an operation execution request from the terminal of the user.

5. An interactive demonstration system for a measuring instrument using a network, according to claim 2, which further comprises a device or parts manufacturer server, and wherein the device or parts manufacturer server specifies a measuring instrument connected to the measuring instrument terminal for the measuring instrument information providing server specified by the device or parts manufacturer server according to a test request for a device for sale by oneself inputted from the user terminal, thereby instructing the user terminal to be connected to the measuring instrument information providing server.

6. An interactive demonstration system for a measuring instrument using a network according to claim 8, wherein the device or parts manufacturer server delivers charge payment information on the measuring instruments to the measuring instrument information providing server.

7. An interactive demonstration system for a measuring instrument using a network using a network comprising:

a measuring instrument providing server;

a user terminal; and a measuring instrument terminal, each of which is connected to a network, wherein the measuring instrument information providing server includes:

storage means for storing an operational program that contains demonstration information including measurement items and measuring conditions of the user's interest, for enabling an operational screen representative of an operating portion for operating a predetermined measuring instrument connected to the measuring instrument terminal and a data display area, and also measuring properties of a desired electronic device including at least one of electronic equipment and electronic parts, thereby switch-connecting the desired object to be measured to the predetermined measuring instrument;

a customer database which stores customer information on users which have gotten access to the measuring instrument information providing server, means for identifying a user obtaining access to the measuring instrument information providing server from the user terminal on the basis of the customer database, and specifying a predetermined measuring instrument with respect to which the user makes a request for operation; and program delivery means for reading out from the storage means the operational program for the predetermined measuring instrument in response to a request for providing the demonstration information including the measurement items and the measuring conditions of the user's interest, on the predetermined measuring instrument from the user terminal, and delivering the program to the user terminal via the network;

the user terminal includes:

a terminal screen and a terminal operating portion;

operation execution request delivery means for delivering via the network the request for providing the demonstration information including the measurement items and measuring conditions of the user's interest to the predetermined measuring instrument to the measuring instrument information providing server and a request for making operation;

program execution means for executing the operational program that contains the demonstration information including the measurement items and the measuring conditions of the user's interest, for measuring the properties of the desired object to be measured, thereby switch-connecting the desired object to be measured to the predetermined measuring instrument, thereby making it possible to visualize the measuring instrument on the terminal screen and to operate the instrument at the terminal operation portion;

means for selecting the desired object to be measured from one or more objects to be measured, which are connected to the predetermined measurement instrument;

means for delivering the operational, command operated and inputted at the terminal operating portion to the measuring instrument terminal via the network, thereby causing desired measurement by the predetermined measuring instrument connected to the measuring instrument terminal; and means for outputting a measurement result received from the measuring instrument terminal to a data display area of the measuring instrument information providing server via the network, and the measuring instrument terminal has means for controlling the predetermined measuring instrument connected to the measuring instrument terminal in response to the operational command from the user terminal, measuring the properties of the desired object to be measured, thereby switch-connecting the desired object to be measured to the predetermined measuring instrument, and for delivering the measurement result obtained by the predetermined measuring instrument to the user terminal via the network.

8. An interactive demonstration system for a measuring instrument using a network according to claim 3, wherein a the measuring instrument information providing server has plural types of information on measuring instruments stored and when an operation execution request inputted from the user terminal while any measuring instrument monitoring information on the measuring instrument can be selected specifies a specific measuring instrument by providing access from the user terminal, the measuring instrument formation providing server delivers to the user terminal an operational screen and an operational program that corresponds to the measuring instrument, and instructs the user terminal to be connected to the measuring instrument terminal to which the measuring instrument has been connected.

9. An interactive demonstration system for a measuring instrument using a network according to claim 8, wherein the measuring instrument information providing server includes a customer database regarding a user who gains access to the measurement instrument information providing server, and when an access from a terminal of the user occurs, the measuring instrument information server identifies the user from the database, and specifies a measuring instrument specified by an operation execution request from the terminal of the user.

* * * * *